United States Patent [19]

Czwartacki

[11] Patent Number: 5,081,746

[45] Date of Patent: Jan. 21, 1992

[54] FLEXIBLE CLOSURE DEVICE

[76] Inventor: Edward J. Czwartacki, 627 A E. Third St., Nescopeck, Pa. 18635

[21] Appl. No.: 547,020

[22] Filed: Jul. 2, 1990

[51] Int. Cl.⁵ ............................................. B65D 63/00
[52] U.S. Cl. .................................. 24/17 B; 24/17 AP
[58] Field of Search ............... 24/17 B, 17 AP, 17 R, 24/3 M, 15, 300, 487; 248/74.3, 74.5

[56] References Cited

U.S. PATENT DOCUMENTS

| 152,876 | 7/1874 | Smith | 24/17 B |
| 424,411 | 3/1890 | Fielder | 24/17 B |
| 526,573 | 9/1894 | Hoffman | 24/15 |
| 1,829,613 | 10/1931 | Sato | 24/17 AP |
| 1,945,932 | 2/1934 | Caley | 24/17 AP |
| 4,569,108 | 2/1986 | Schwab | 24/17 B |

FOREIGN PATENT DOCUMENTS

| 1126130 | 11/1956 | France | 248/74.3 |
| 13946 | of 1900 | United Kingdom | 24/17 B |
| 698696 | 10/1953 | United Kingdom | 24/17 AP |

Primary Examiner—Victor N. Sakran

[57] ABSTRACT

A flexible circular closure device with a wedge shaped tab protruding from the outer circumference which is utilized to close a container with a flap having an aperture defined in it by insertion of the tab into the aperture and wrapping the circular closure around the container which may be a folder, envelope or the like.

2 Claims, 1 Drawing Sheet

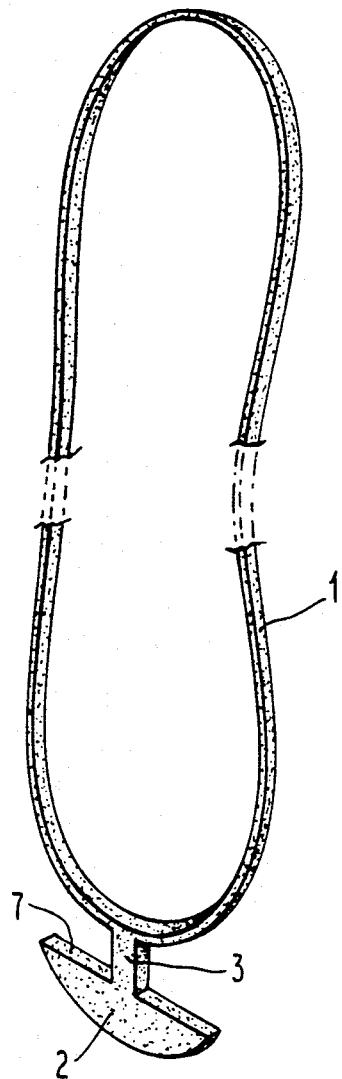
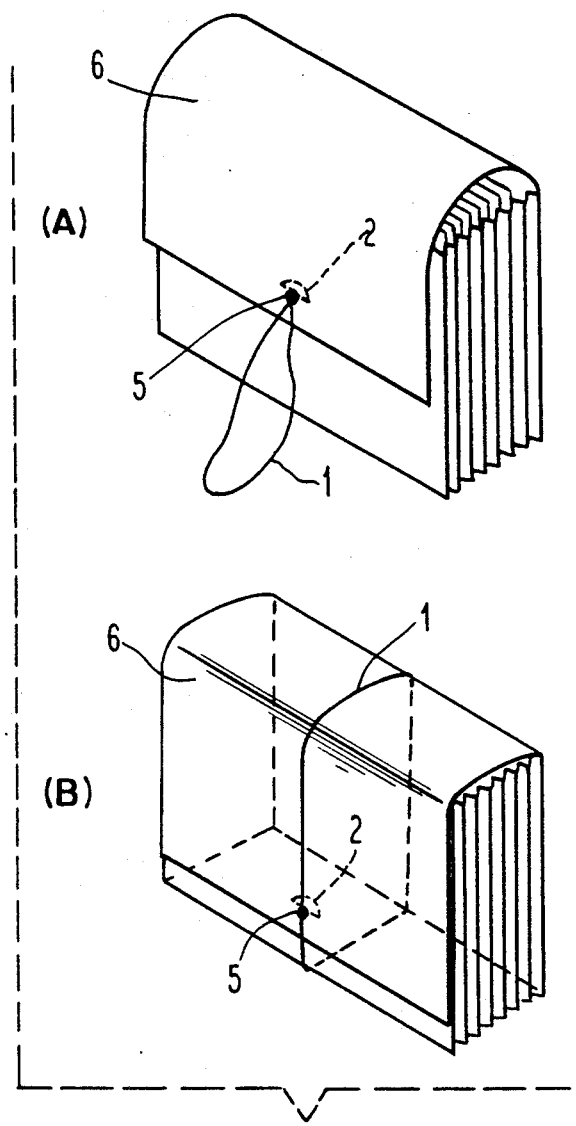
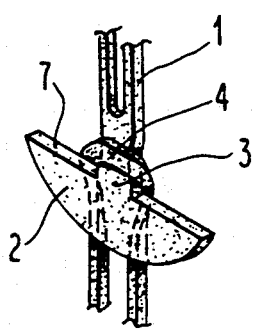
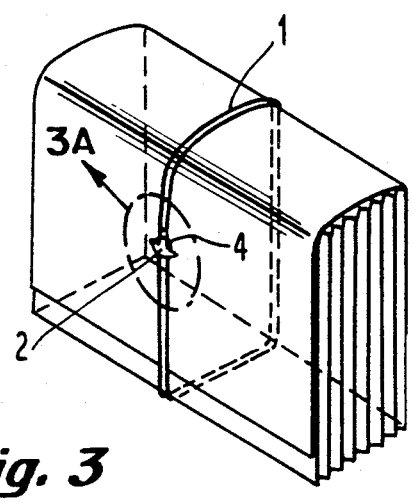
Fig. 1
Fig. 2
Fig. 3A
Fig. 3

FLEXIBLE CLOSURE DEVICE

The present invention is directed to fasteners and closure devices, which can provide a quick, easy and inexpensive means to close a folder, envelope or the like.

More particularly the present invention relates to a stretchable closure device which is inexpensive and reusable.

THE PRIOR ART

Foldable closure flaps on file folders, note books, envelopes and the like are often closed with string and lock button types of closing devices. These devices are easily broken or disengaged and lost and often do not maintain a tight fit.

A flexible or stretchable closure strip overcomes theses disadvantages of the prior art.

Other flexible type closure straps have been known which were elastic in the main body and a button or rivet attached to allow for a fastening means but these devices are expensive and often the button or rivet used becomes broken or unattached. Further, rivet devices are expensive to produce in volume.

The present invention overcomes this disadvantage as well by being made from a single one-piece construction.

SUMMARY

These advantages of the present invention are provided by an article of manufacture, a closure device for closing a flap with a hole therein which comprises;
  a. a generally circular main body
  b. a tab protruding from the body and attached thereto by a neck portion where the neck portion is at least as long as the thickness of the flap whereby the tab may be inserted in a hole in the flap, the closure device may be wrapped around a file folder or the like in a loop to complete the closure.

The advantage of the present invention will be more readily understood by a review of the descriptions and drawings which follow.

FIG. 1 is a perspective view of the device of the present invention.

FIG. 2 is a perspective view of the device engaged on a file.

FIG. 3 shows a perspective view of the device without a hole-flap.

FIG. 3A shows a perspective view of the device restrained by its neck portion.

PREFERRED EMBODIMENT

As shown in FIG. 1, the present closure device takes the form of a generally circular band or strap with a compressible tab 2, protruding from body 1, at a given location on the outer circumference of the body 1. The tab is attached by neck portion 3, which spans a given space to allow the tab to be inserted into a given size hole 5, in the envelope 6. The body of the strap is then stretched around the file or the like to complete the operation. The tab is preferably shaped in a wedge to allow easy insertion into a hole and its rear side 7, is flat to provide for a firm connection. The neck 3, is at least as long as the flap is thick to allow insertion of the tab 2.

In another embodiment, the body 1, can be wrapped around the item to be closed and loop 4, in FIG. 3, so formed is passed around tab 2, so that the body 1, is held in the neck area 3, by the pressure of the elongation of the device against the inner portion 7, of tab 2. To disengage, the body is stretched and loop 4, is merely removed from the neck portion and the strap contracts to its original size close to its natural elasticity.

This method can be used in an application where a flap with a hole in it is not provided.

In either configuration, the body, tab and neck are constructed from a flexible, compressible material such as sum rubber or the like.

The device can be utilized to hold various types and arrangements of envelopes, file folders or the like and may be constructed in various sizes to accommodate all standard file shapes and thicknesses and to allow for different size holes. Such modifications in size are contemplated to be within the scope of the present invention.

I claim:

1. A one-piece device for closing the flap on a file or envelope which has a flap with an aperture defined therein comprising a one-piece stretchable body of circular configuration, a neck portion from the body of a length of at least as big as the envelope thickness and a tab which can be compressed to allow insertion of the tab into the aperture in the flap whereby the body can be stretched around the file in a fixed position.

2. The device of claim 1 wherein the body, tab and neck are one molded rubber piece and the tab is wedge-shaped.

* * * * *